United States Patent
Polosa et al.

(10) Patent No.: US 11,598,033 B2
(45) Date of Patent: Mar. 7, 2023

(54) METHOD FOR PREPARING A NONWOVEN WEB

(71) Applicant: Suominen Oyj, Helsinki (FI)

(72) Inventors: Gian Luca Polosa, Varese (IT);
Muralidhar Lalagiri, Vernon, CT (US);
Laura LaPlante, Collinsville, CT (US);
Miika Nikinmaa, Simsbury, CT (US);
Avinav G. Nandgaonkar, Vernon, CT (US)

(73) Assignee: Suominen Oyj, Helsinki (FI)

( * ) Notice: Subject to any disclaimer, the term of this patent is extended or adjusted under 35 U.S.C. 154(b) by 305 days.

(21) Appl. No.: 16/829,080

(22) Filed: Mar. 25, 2020

(65) Prior Publication Data

US 2020/0308742 A1    Oct. 1, 2020

Related U.S. Application Data

(60) Provisional application No. 62/823,016, filed on Mar. 25, 2019.

(51) Int. Cl.

| | | |
|---|---|---|
| *D04H 1/495* | (2012.01) | |
| *D04H 1/54* | (2012.01) | |
| *D04H 1/70* | (2012.01) | |
| *D04H 3/02* | (2006.01) | |
| *G06K 7/14* | (2006.01) | |

(52) U.S. Cl.
CPC ............... *D04H 1/495* (2013.01); *D04H 1/54* (2013.01); *D04H 1/70* (2013.01); *D04H 3/02* (2013.01); *G06K 7/1408* (2013.01); *G06K 7/1447* (2013.01)

(58) Field of Classification Search
CPC ............ D04H 1/495; D04H 1/54; D04H 1/70; D04H 3/02; G06K 7/1408; G06K 7/1447
See application file for complete search history.

(56) References Cited

U.S. PATENT DOCUMENTS

| 2002/0100153 A1* | 8/2002 | Takai | D04H 1/495 |
| --- | --- | --- | --- |
| | | | 28/104 |
| 2008/0256768 A1 | 10/2008 | Lampila et al. | |
| 2008/0300562 A1* | 12/2008 | Ahoniemi | D04H 1/495 |
| | | | 604/385.01 |
| 2014/0004307 A1* | 1/2014 | Sheehan | A61K 8/0208 |
| | | | 428/156 |
| 2014/0090217 A1* | 4/2014 | Jonsson | D04H 1/492 |
| | | | 28/103 |
| 2018/0236733 A1* | 8/2018 | Hollander | D04H 3/05 |

FOREIGN PATENT DOCUMENTS

| EP | 1209270 A1 | 5/2002 |
| --- | --- | --- |
| WO | WO2010021572 A1 | 2/2010 |
| WO | WO2016173685 A1 | 11/2016 |
| WO | WO2017074421 A1 | 5/2017 |
| WO | WO2019115875 A1 | 6/2019 |

\* cited by examiner

*Primary Examiner* — Jeremy R Pierce
(74) *Attorney, Agent, or Firm* — Laine IP Oy

(57) ABSTRACT

The present invention relates to a method for producing a nonwoven fabric. The method according to the invention comprises forming a nonwoven web using a wet lay forming process, hydroentangling the web and providing the web with a high quality hydroembossed pattern. The invention also concerns a nonwoven fabric exhibiting a three dimensional pattern, which remains even in wet wipes prepared from the material.

16 Claims, No Drawings

METHOD FOR PREPARING A NONWOVEN WEB

CROSS-REFERENCE TO RELATED APPLICATIONS

This application claims the benefit of and priority to U.S. Application No. 62/823,016, filed Mar. 25, 2019, the entirety of which is incorporated by reference herein.

FIELD OF THE INVENTION

The invention relates to the production of a nonwoven fabric. More specifically, the invention relates to a method for preparing a nonwoven web using a wet lay forming process, hydroentangling the web and providing the web with a high quality hydroembossed pattern, which remains even in wet wipes prepared from the material.

BACKGROUND

A significant number of requirements are applied to nonwoven consumer wipes. They must have sufficient strength and abrasion resistance for the purported use, they must have sufficient absorption capacity, and they must have sufficient biodegradability so as not to cause a long lasting environmental load. Legislation will become stricter and consumer awareness will rise. For consumer wipes for personal hygiene.

Imprinting patterns on nonwoven material is desirable for a number of reasons. Apart from the obvious decorative aspect, patterns may convey information in a variety of ways; see international patent application No. PCT/FI2018/050902.

Wet laying is a web forming process which is a fast, economical, and environmentally friendly method. All the water used for wet laying is filtered and reused. The wet laying process provides better product performance as compared to the air lay process, because it can process short-cut fiber such as wood pulp, and other natural, manmade and synthetic fiber. Wet laying of natural fibers provides better uniformity of the web and low linting due to strong hydrogen bonding between the fibers. The initial steps of wet laying a nonwoven web is analogous to papermaking. Wet laid webs require binding to provide strength. If the furnish includes thermoplastic material, heat may be used to partly melt that material, thereby consolidating the web. The presence of thermoplastics, however, is not desirable from a biodegradability point of view. The binding can also be done chemically with the help of added binding agents.

Hydroentangling is a widely used method for consolidating webs in the production of nonwoven. The fibers are entangled by means of high pressure water jets. If the web is carried on a support having a patterned structure, the hydroentanglement process may leave a permanent pattern in the web, whereby the process may be referred to as hydroembossing.

In international patent application publication No. WO 2017/074421, a process is disclosed for forming a nonwoven web from an aqueous fiber suspension, hydraulically entangling the web and subjecting it to further hydroentanglement from both sides using a drum. The fiber suspension comprises synthetic staple fibers and cellulosic fibers. The web is carried through the hydroentangling process supported on one or several foraminous belts.

In US patent application publication No. 2014/0090217 is disclosed a method for producing a nonwoven material by hydroentangling a fiber mixture, wherein a web is wetlaid and hydroentangled. The web contains spunlaid filaments, natural fibers and synthetic staple fibers. After the initial hydroentanglement, spunlaid filaments are laid on top of the first web; a second fibrous web is wetlaid on top of the filaments; and the resulting web is hydroentangled from both sides in turn.

In international patent application publication No. WO 2016/173685 is disclosed an apparatus for consolidating and imposing a structure on a nonwoven web. The web is conveyed between two parallel bands, at least one of which is a structure-imposing band, and the web is subjected to hydroentanglement within a structure-imposing zone. The web can be subjected to further hydroentanglement operations before or after the structure-imposing zone, using rolls which can also impose a structure on one side of the web.

Thus, patterning in the prior art is conventionally carried out using thermal calendering or belt patterning. Changing a belt is time consuming. After changing a belt, tension adjustment in order to prevent belt breakage adds to the task. The path of a belt is not consistent; it may run straight or bend, and a pattern needs to survive variability in belt curvature. Current patterning techniques using a belt involve a risk of clogging of dewatering holes, since additional material is added on top of the belt. As patterning is usually done without prior entanglement of the web, there is also a risk of creating holes in the nonwoven, since patterning moves the fibers. This is particularly serious when producing low basis weight products. A belt patterning unit is long, so if there would be two different hydroentangling units, the size of the machine would grow significantly.

Thermal calendering is associated with other drawbacks. The presence of synthetic fibers makes it possible to create sharp patterns by melting those fibers. However, biodegradable fibers will not melt at the usual temperatures. Thermal calendaring weakens the fabric, and in some cases weakening is not acceptable due to strength requirements. Pressure is the main factor in creating the pattern, and heat can only enhance the effect. The resolution in the pattern is necessarily affected. Patterns created in biodegradable material usually suffer significantly when moistened.

In thermal calendaring equipment, the patterning roller is metal and the counter-roll is flat rubber. The heat is generated by oil inside the roller, and a roll changeover involves cooling, emptying, refilling and reheating, which makes the process time-consuming.

Hydroembossing or thermal calendaring of a wet laid web according to the prior art does not produce a nonwoven material having a pattern of sufficiently high definition for the purposes mentioned above. Moreover, prior art wet laid patterned nonwovens tend to lose the patterning when wetted with various liquids and lotions used for sealedly packed wet wipe products.

DEFINITIONS

The term "nonwoven web or fabric" as used herein refers to a web having a structure of fibers or filaments which are interlaid without exhibiting a regular pattern as in a woven fabric.

Short cut fiber (regenerated/synthetic) as referred to herein is in the range of 3 mm to 18 mm. It can be used in wetlaid and airlaid production.

Regenerated fiber as used herein is a fiber created by converting cellulose to a soluble cellulosic derivative and subsequently regenerating it to fiber. Examples are lyocell, tencel, rayon and viscose.

Natural fiber as used herein is a cellulose fiber of natural origin. Examples are wood pulp and fiber from hemp, flax, cotton, jute, bamboo, sisal and kapok.

The term "machine direction" as used herein refers to the direction of travel of the forming support receiving fibers during formation of the web.

The term "cross machine direction" as used herein refers to the direction perpendicular to the machine direction as above.

SUMMARY

According to the method of the present invention, an aqueous fiber suspension is prepared. The fiber suspension may have a composition comprising any combination of synthetic fibers, man-made fibers and natural fibers. Man-made fibers include regenerated, cellulose based fibers.

Using this suspension, a first web is wet laid on a wire.

The web comprising the first wetlaid layer and optional unwound second and third layer(s) is subsequently consolidated using hydroentanglement.

The initial wet laying can be carried out on the same wire as the hydroentanglement, or separate wires may be employed.

The strength of the wet laid web is sufficient to allow the removal of the web from the wire. The web is thus self-supporting and may be transferred to a hydroembossing station comprising a roll having a surface pattern which is imposed on the web, forming a high definition three-dimensional pattern.

In a high definition pattern, fibers have been moved from their initial location in the plane of the web, creating a three-dimensional structure which is more distinct than the two-dimensional patterns that can be created using belt hydroembossing or thermal calendaring.

A high definition pattern as used herein refers to a pattern exhibiting a contrast between differing areas allowing machine readability, e.g. using methods disclosed in International Patent Application No. PCT/FI2018/050902.

In one aspect, there is provided a method for producing a nonwoven fabric having a three-dimensional pattern thereon, the method comprising:
  forming a first web from an aqueous suspension of fibers on a wire support;
  hydroentangling the first web to provide a self-supporting web;
  removing the self-supporting web from the wire support;
  hydroembossing the self-supporting web via a hydroembossing roll having a sleeve associated with the roll, the sleeve having a negative impression of the three-dimensional pattern within a body thereof, wherein the hydroembossing comprises moving a portion of the fibers of the self-supporting web into the negative impression of the sleeve to form the three-dimensional pattern on the self-supporting web; and
  drying the self-supporting web to provide the nonwoven fabric having the three-dimensional pattern thereon.

Aspects of the present invention also relate to a nonwoven fabric formed by the processes described herein.

DETAILED DESCRIPTION

In an embodiment, the aqueous fiber suspension has a solids content in the range of 0.5% to 5% by weight of the suspension.

In at least one embodiment, the aqueous fiber suspension to be subjected to wet laying according to the present invention comprises short cut fibers and natural fibers.

In at least one embodiment, the suspension may be laid on the wire on top of a second, unwound web which may be, for example, of the spunbond, spunlace, wetlaid or tissue type.

In at least one embodiment, a third layer of unwound material may be applied on top of the first, wetlaid layer.

The tensile strength of the web following the consolidation should be at least 70 g/25 mm for webs used in multilayered products. For single layer products it should be at least 200 g/25 mm. This strength is sufficient to allow the removal of the web from the wire support.

In an embodiment, the embossing pattern is on a sleeve which is detachable from the roll. The pattern resolution and the hydroembossing parameters in combination with the degree of consolidation in the web at the time it reaches the roll provide a pattern which is of sufficiently high definition and persistence to satisfy the requirements of information coding and/or permanency in the wet state. Exemplary nonwoven materials having encoded information thereon and methods for encoding information are disclosed, for example, in PCT publication No. WO2019/115875, the entirety of which is incorporated by reference herein. Suitable sleeves for use in the processes described herein are disclosed in PCT publication No. WO2020/021158, the entirety of which is incorporated by reference herein.

The consolidation of the web following wet laying, carried out through hydroentangling, provides a tensile strength which preserves the web in a consistent shape as it is lifted from the forming wire. Too little consolidation may cause, apart from the obvious risk of web breakage, holes in the web. Excessive consolidation does not leave sufficient formability in the web for the subsequent hydroembossing step carried out on a roll. The appropriate degree of consolidation is acquired using the following parameters:

| Speed (ft/min) | Nozzle psi | Nozzle size μm | Vacuum (mbar) |
|---|---|---|---|
| 500-1100 | 1-1200 | 80 to 150 | 1-450 |

Following hydroentanglement and dewatering on a wire, the tensile strength of the web is in the range of 80 to 120% of its final tensile strength.

Following the hydroentanglement and dewatering step, the web is transferred to a hydroembossing roll, preferably provided with a sleeve, for imposing a three-dimensional high definition pattern to the web.

In certain embodiments, inside the roll, there is provided a partial vacuum for removing excess water from the hydroembossing through provided openings. In an embodiment, there are from 1 to 5 hydroentanglement units hydroembossing the web.

In the following discussion, the top surface of the fabric is the surface that faces the sleeve during the hydroembossing operation; the bottom surface is the one exposed to the water jets.

For considering the three-dimensional structure of the web of the present invention, the base level is defined as the level of the bottoms of the deepest depressions in the fabric, i.e. the level of the thinnest areas in the fabric or a minimum thickness of the fabric. In an embodiment, the thickness of the fabric at its thinnest points or minimum thickness is at least 30 μm.

The embossing level is a level on the top surface of the fabric which is farthest or at a maximum distance from the base level. Put another way, the embossing level comprises areas (elevated portions) with a maximum thickness of the fabric. In this context, a pattern in a nonwoven web is considered a three-dimensional high definition pattern if the embossing level or maximum thickness is at least 200 μm above the base level or minimum thickness. In the present context, this dimension may also be referred to as a height of the pattern. In an embodiment, the embossing level or maximum thickness is at least 250 μm; and in other embodiments is at least 300 μm above the base level of the fabric. The angle of inclination in a high definition three-dimensional pattern refers to the angle of the slope of the elevated portions of the fabric relative to a plane of the base level. In a three-dimensional high definition pattern, the angle of inclination of the rise from the base level to respective elevated portion(s) is in the range 48° to 90°; preferably in the range of 55°-88°. In certain embodiments, the 3D pattern is machine readable.

Angles and dimensions in nonwoven fabric structures may be determined using laser triangulation technology. Further, angles and dimensions of the embossing tool may be determined.

As a portion of the fibres are moved from their original location during hydroembossing using a sleeve, the grammage of the patterned portions of the fabric, i.e. the portions of the fabric receiving the displaced fiber increases at least 10% by weight, e.g., 10-30% by weight or 15-30% by weight. Thus, the patterned areas contain at least 10% by weight more fiber than the non-patterned areas.

The web is subsequently subjected to drying using e.g. an air dryer, a can dryer, an omega dryer or combinations of these.

In one embodiment of the invention, the web is biodegradable, i.e. contains no synthetic material. In this embodiment, the web comprises from 20 wt % to 80 wt % pulp and from 20 wt % to 80 wt % regenerated fibers. In this embodiment, the basis weight of the fabric is in the range 35 gsm to 80 gsm; the wet tensile strength is between 1000 to 4000 g/25 mm MD; and the thickness is in the range 400 to 1000 μm. Consolidation is carried out using between 4 and 15 hydroentanglement nozzle bars.

In an embodiment, the wet tensile strength is in the range of 800 g/25 mm to 4500 g/25 mm and the water content is in the range of 85%-92% by weight when the web is lifted off the forming wire for subsequent hydroembossing. Hydroembossing is carried out using 1-4 nozzle bars.

A three-dimensional nonwoven exhibits clear performance improvements relative to a flat nonwoven of the same composition and grammage.

In one embodiment, 32% by volume of the nonwoven constitutes an elevated pattern of thin lines forming isolated patterns evenly distributed on the nonwoven. The embossing level on the patterned area is at least 200 μm above the base level and the angle of inclination from the base level to the elevated portions is in the range 48°-90°, preferably in the range 55°-88°.

When comparing to a flat nonwoven, the limited area of contact with a wiped surface enhances the capillary effect of the nonwoven and thus increases the water absorption capacity by at least 50%. Having a three-dimensional nonwoven does not only increase the surface area of the product, but it will also create varying contact angles in respect of the wiped surface. The increased surface area resulting from the generated 3D structure and the varied contact angle can increase dirt pick-up at least 45%.

Hydroentanglement and hydroembossing bring several advantages relative to belt patterning and thermocalendering. Changing an embossing sleeve is a rapid operation compared with the changing of a thermoembossing roll: The sleeve is light and easy to handle. Once a sleeve is installed, there is no need for additional adjustments but the line can be started immediately, whereas a belt requires adjustment and a thermoembossing roll requires oil handling and heating. A sleeve allows great flexibility as to the character and the degree of detail in the pattern. Since the pattern is generated through the "valleys" or impressions in the sleeve surface, blocking of dewatering holes does not occur. This allows sharper and more detailed patterns. As the web is pre-entangled, only part of the fibers will move into the pattern. Moving a portion of the fibers into the pattern is a more controllable process than moving them out of the pattern, and this reduces the risk of creating holes in the nonwoven. Although the distribution of fibers is no longer even, the reduction in CD and MD strength is minimal. Unlike in thermal calendering, hydroembossing moves the fibers, and therefore the pattern will be retained both in a dry and in a wet state. Instead of compressing the web, as occurs while calendering, the displacement of fibers in the pattern will increase the thickness in some areas, creating a feel of increased overall thickness in the entire fabric. The variation in thickness improves the overall water absorption capacity. As no significant mechanical pressure is applied to the web, fiber damage which can weaken the fabric is minimized. Although the web becomes thinner in some areas, this does not significantly reduce its performance in terms of tensile strength, burst strength, toughness or abrasion resistance.

The invention claimed is:

1. A method for producing a nonwoven fabric comprising a three-dimensional pattern thereon, the method comprising:
    forming a first web from an aqueous suspension of fibers on a wire support;
    hydroentangling the first web to provide a self-supporting web;
    transferring the self-supporting web from the wire support to a hydroembossing roll in a way in which the self-supporting web supports itself during the transfer;
    hydroembossing the self-supporting web via the hydroembossing roll, the hydroembossing roll comprising a sleeve associated with the roll, the sleeve having a negative impression of the three-dimensional pattern within a body thereof, wherein the hydroembossing comprises moving a portion of the fibers of the self-supporting web into the negative impression of the sleeve to form the three-dimensional pattern on the self-supporting web; and
    drying the self-supporting web to provide the nonwoven fabric comprising the three-dimensional pattern thereon.

2. The method of claim 1, further comprising hydroentangling the first web with one or more additional unwound webs.

3. The method of claim 1, wherein the sleeve is detachable from the roll.

4. The method according to claim 1, wherein the aqueous suspension is laid on the wire support on top of a second unwound web of a spunbond, spunlace, wetlaid or tissue type.

5. The method according to claim 4, wherein a third unwound web of a spunbond, spunlace, wetlaid or tissue type is further laid on top of the second web.

6. The method according to claim 1, wherein the aqueous suspension comprises both short cut regenerated fibers and natural fibers.

7. The method according to claim 1, wherein a height of the three-dimensional pattern on the nonwoven fabric comprises at least 200 μm between a minimum and maximum thickness of the nonwoven fabric.

8. The method of claim 1, wherein the hydroentangling is done at a speed of 500-1100 ft/min, a nozzle pressure of 1200 psi, with a nozzle size of 80-150 micron, and at a vacuum pressure of 1-450 mbar.

9. The method of claim 1, wherein during the hydroembossing, excess water is removed through openings in the hydroembossing roll.

10. The method according to claim 1, wherein in the nonwoven fabric, an angle of inclination from a minimum thickness to a maximum thickness of the nonwoven fabric is in a range 48°-90°.

11. The method according to claim 1, wherein areas of the nonwoven fabric comprising the patterned area comprise at least 10% more fibers by weight than non-patterned areas of the nonwoven fabric.

12. The method according to claim 1, wherein the self-supporting web comprises a mixture of pulp and regenerated fibers.

13. The method according to claim 1, wherein the pattern comprises a machine readable code.

14. The method according to claim 1, wherein a tensile strength of the web following the hydroentangling and prior to removal from the wire support is at least 200 g/25 mm for single layer products.

15. The method according to claim 1, wherein a tensile strength of the web following the hydroentangling and prior to removal from the wire support is at least 200 g/25 mm for multilayered products.

16. A method for producing a nonwoven fabric comprising a three-dimensional pattern thereon, the method comprising:

forming a first web from an aqueous suspension of fibers on a wire support;

hydroentangling the first web to provide a self-supporting web;

removing the self-supporting web from the wire support;

hydroembossing the self-supporting web via a hydroembossing roll comprising a sleeve associated with the roll, the sleeve having a negative impression of the three-dimensional pattern within a body thereof, wherein the hydroembossing comprises moving a portion of the fibers of the self-supporting web into the negative impression of the sleeve to form the three-dimensional pattern on the self-supporting web; and drying the self-supporting web to provide the nonwoven fabric comprising the three-dimensional pattern thereon, wherein the hydroentangling is done at a speed of 500-1100 ft/min, a nozzle pressure of 1-1200 psi, with a nozzle size of 80-150 micron, and at a vacuum pressure of 1-450 mbar.

\* \* \* \* \*